UNITED STATES PATENT OFFICE.

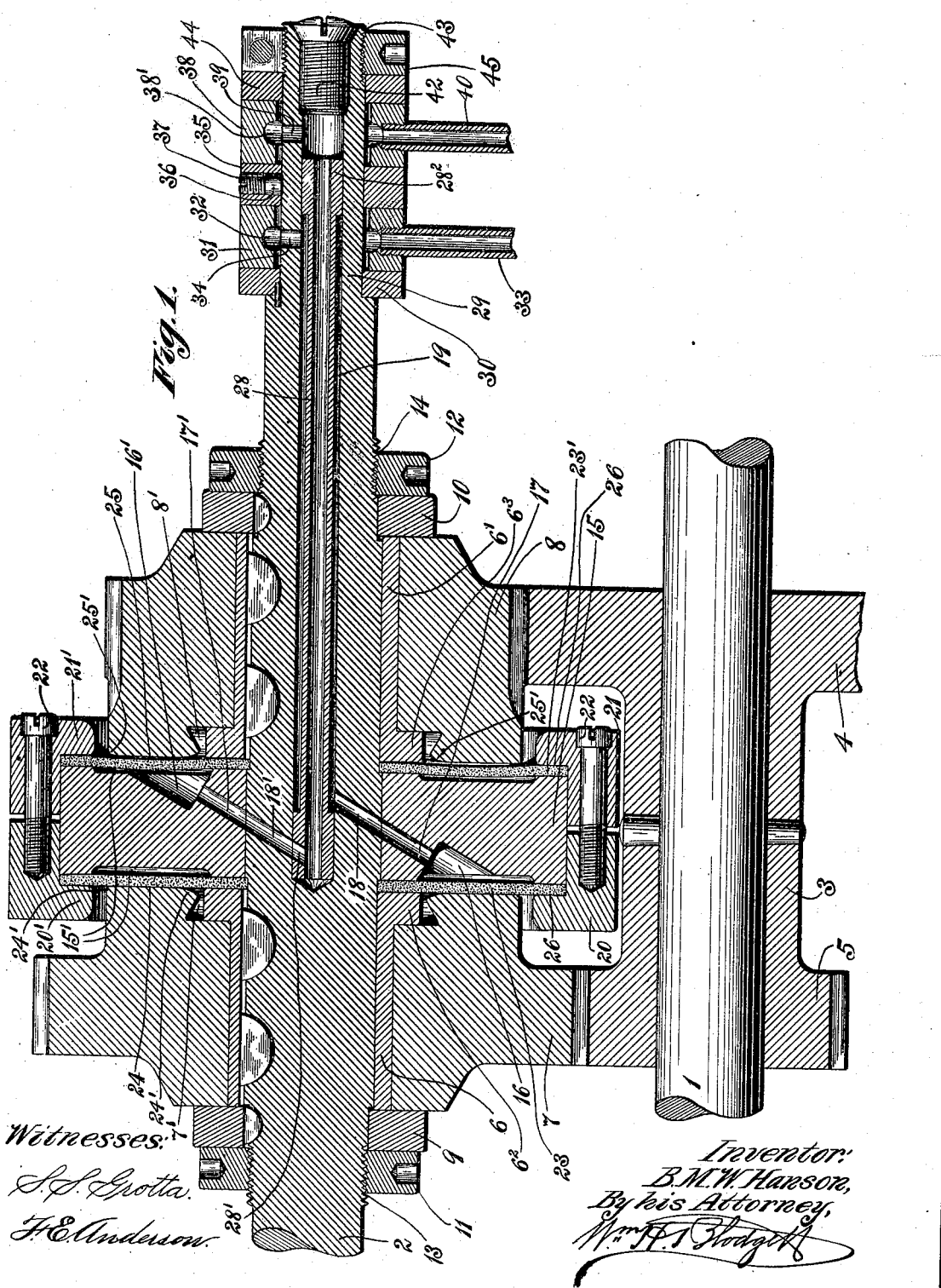

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

FLUID-TIGHT JOINT FOR ROTARY SHAFTS.

No. 847,574.   Specification of Letters Patent.   Patented March 19, 1907.

Application filed November 21, 1905. Serial No. 288,427.

*To all whom it may concern:*

Be it known that I, BENGT M. W. HANSON, a citizen of Sweden, having declared my intention of becoming a citizen of the United States, residing at Hartford, in the county of Hartford and State of Connecticut, have invented certain new and useful Improvements in Fluid-Tight Joints for Rotary Shafts, of which the following is a specification.

This invention relates to means for supplying fluid to clutches, and while shown employed with the form of clutch covered by my application filed in the United States Patent Office March 3, 1905, Serial No. 248,231, to which reference may be had, is not limited thereto.

In prior constructions known to me leakage frequently occurs at the joints where the fluid enters the passage leading to the movable member of the clutch, and as said passages are formed in a rotary shaft it is necessary to connect the supply-conduits to said shaft in such a way that a fluid-tight connection will be formed.

Primarily the object of my invention is the provision of a joint of improved construction for connecting the supply-conduits to the shaft.

Other objects of the invention will be set forth in the following description.

In the accompanying drawing, the figure is a longitudinal vertical section of the form of clutch with which the invention is shown employed.

Referring to the drawing, the numeral 1 designates a driving-shaft, and 2 a driven shaft, both to be journaled in framework of any desired kind. Upon the shaft 1 is keyed or otherwise rigidly fastened a sleeve 3, carrying at one end a large gear 4 and at its opposite extremity a smaller gear 5. It is, however, immaterial whether the gears 4 and 5 form part of a sleeve, as shown, or are connected in other ways to the shaft 1.

Keyed to the driven shaft 2 are bushings 6 6', having flanged inner ends $6^2$ $6^3$, and upon the bushing 6 is loosely mounted a large gear 7 in engagement with the small gear 5 of shaft 1, while on the bushing 6' is also loosely mounted a smaller gear 8 in engagement with the large gear 4 of the shaft 1. Collars 9 and 10 on the shaft prevent displacement of the gear-wheels 7 and 8, and said collars are held in place by nuts 11 and 12, engaging threaded parts 13 and 14 of said shaft.

Rigid with the shaft intermediate the flanged inner ends of the bushings is a carrier or clutch-disk 15, the sides of said carrier being circumferentially grooved at 15', respectively, to form passage-ways for fluid under pressure, as hereinafter described. Leading from said grooves are chambers 16 16', respectively, and in the body of the disk 15 are passages 17 17', respectively, communicating with said chambers, registering with passages 18 18' in the shaft 2 and opening into a longitudinal bore 19 thereof. Clamping-rings 20 21, having circumferential flanges 20' 21', are secured to the carrier 15 by screw-bolts 22. Disks or diaphragms 23 23' of leather or other suitable material are clamped to the clutch-disk or carrier 15 by the flanges 20' 21'.

To receive the flange $6^2$ of bushing 6, the gear-wheel 7 is grooved on its inner side, as at 7', and this results in an overhanging straight circumferential bearing-face 24, having, preferably, rounded ends 24'. Against said bearing-face 24 the disk 23 is forced by the fluid when admitted through the chamber 16 and conduits 17 18, as will be hereinafter described.

Like gear-wheel 7, the gear-wheel 8 is provided with a groove 8' to receive the flange $6^3$ of bushing 6' and is provided with a straight bearing-face 25, having rounded ends 25', said bearing-face being engaged by the disk 23' when fluid under pressure is admitted to the chamber 16' through the passages 17' 18'.

Each disk 23 23' is clamped against an inclined bearing-face 26 of the circumferential flanges 20' 21', the result being that the disk is placed under tension and normally tends to spring inward and assume a bowed form when not in contact with the bearing-face of the gear-wheel with which it coöperates, as shown by the disk 23' at the right of carrier 15. When, however, pressure is applied to either disk, it is straightened with a toggle-like action and is forced snugly into contact with the bearing-face of the gear-wheel, thereby locking said gear-wheel to the carrier 15. Cutting and fracture of the disks are prevented by the rounded corners of the bearing-faces, and a full flat bearing of the disk against its bearing-face is the result of the construction above described.

For delivering motive fluid under pressure to the passages 17 17' and chambers 16 16' any desired connections may be employed, and I have shown for this purpose a bore 19 in shaft 2 communicating with the passage 18 and a tube 28 inserted in said bore and having a port 28' registering with the passage 18'. This tube terminates in a head 28², located intermediate the ports hereinafter described.

Keyed to the shaft 2 and mounted on a reduced end 29 thereof is a collar 30, and adjacent to said collar and loose on the shaft is an annulus 31, having a circumferential groove 32 in its inner wall. For supplying fluid to said groove a pipe 33 is threaded into the annulus and communicates with the groove thereof, a port 34 constituting a passage from the groove to the bore 19 of the shaft 2 and said pipe locking the annulus against rotation with the shaft. Mounted on the shaft 2 adjacent to the outer side of the annulus 31 is a hardened collar 35, said collar being attached to the shaft by a plug 36, driven to its work by a screw 37. Loose on the shaft at the outer side of the collar 35 is a second annulus 38, grooved at 38' to form a circumferential passage communicating with a port 39 of said shaft. A supply-pipe 40 enters the annulus 38, holds said annulus against rotation, and communicates with the port 39 thereof.

At its end the reduced part 29 of the shaft 2 is internally threaded at 41 to receive a screw-plug 42 and is externally threaded at 43. A washer 44 is mounted on said reduced end 29, and a split nut 45 engages the external thread 43 and bears against said washer.

From what has been stated it will be seen that a chamber is formed in the shaft 2 between the inner end of the plug 42 and the head 28² of tube 28 and that fluid from the passage 38' of annulus 38 will enter port 39 leading to said chamber, pass through the tube 28 and passages 18', 17', and 16', and will force the diaphragm against the clutch-face 25, thereby locking the carrier 15 rigid with shaft 2 to the gear 8 and rotating the said shaft at a certain speed.

When it is desirable to drive the shaft 2 at a different speed, fluid is shut off from conduit 40 by suitable valve mechanism (not shown) and is turned into pipe 33, thus permitting the diaphragm 23' to assume its normal bowed or buckled form and releasing the gear 8, which will then rotate idly on the bushing 6'. As the fluid leaves pipe 33 it enters groove 32 of annulus 31, the bore 19 of shaft 2, (through port 34,) and traveling through passages 18, 17, and 16 acts upon the diaphragm 23, thus locking the carrier 15 to the gear-wheel 7 and rotating the shaft 2 at a rate of speed different from that acquired from gear-wheel 8.

By adjusting the nut 45 the various parts on the reduced end 29 of the shaft may be forced together to form tight non-leakable joints.

Changes may be made in various details of the invention, which is neither limited to employment with clutches nor to the precise construction shown and described.

Having thus described my invention, what I claim is—

1. The combination, with a rotary shaft having a longitudinal bore, and a port and a passage communicating with said bore, of an annulus surrounding the shaft, and having a passage leading to said port; a fluid-supply conduit engaging the annulus and in communication with the passage thereof; a washer rigid with the shaft, and engaging one side of the annulus; a collar rigid with the shaft, and engaging the other side of the annulus; and a clutch actuated by fluid delivered from the passage leading to the bore of the shaft.

2. The combination, with a tubular shaft having ports and passages, of rings loose on the shaft, and each having a circumferential passage communicating with the ports of the shaft; conduits for supplying fluid under pressure to said rings; a tube within the shaft, and having a port in communication with the circumferential passage of one of the rings; clutch-surfaces controlled by the fluid received from the shaft and tube; and a collar rigidly secured to the shaft, and covering the inner opposing sides of the rings.

3. The combination, with a rotary shaft having a longitudinal bore, and passages leading from said bore, of a pair of rings mounted on said shaft, each of said rings having a circumferential passage; a collar rigid with the shaft, and located between the rings; means for forcing the collar and rings longitudinally of the shaft to thus form a fluid-tight joint between the parts; and fluid-supply conduits entering the rings and preventing said rings from rotation on the shaft.

4. The combination, with a rotary shaft having a longitudinal bore, of a pair of internally-grooved rings mounted on the shaft; fluid-supply conduits entering the rings and preventing them from rotation with the shaft, said conduits communicating with the passages in said rings; a collar rigid with the shaft located between the rings, and bearing at its sides against said rings; a nut threaded upon the shaft; and a washer intermediate said nut and one of the rings.

5. A fluid-tight joint for a tubular and rotary shaft comprising a pair of internally-grooved rings; means for supplying fluid to said rings; a washer located between the rings and bearing against the opposing sides thereof; a second washer bearing against the side of one of the rings; a nut threaded upon the shaft, and in engagement with said second washer; and a screw-plug tapped into the shaft at the extremity thereof.

In testimony whereof I affix my signature in presence of two witnesses.

BENGT M. W. HANSON.

Witnesses:
  GEO. H. HOLDEN,
  KATHRYN T. M. O'CONNELL.